US006952420B1

(12) United States Patent
Castellano

(10) Patent No.: US 6,952,420 B1
(45) Date of Patent: Oct. 4, 2005

(54) SYSTEM AND METHOD FOR POLLING DEVICES IN A NETWORK SYSTEM

(75) Inventor: Robert Castellano, Howell, NJ (US)

(73) Assignee: Paradyne Corporation, Largo, FL (US)

( * ) Notice: Subject to any disclaimer, the term of this patent is extended or adjusted under 35 U.S.C. 154(b) by 862 days.

(21) Appl. No.: 09/691,756

(22) Filed: Oct. 18, 2000

Related U.S. Application Data

(60) Provisional application No. 60/160,127, filed on Oct. 18, 1999.

(51) Int. Cl.[7] .............................. H04J 3/16; H04L 12/56
(52) U.S. Cl. ..................................... 370/395.6; 370/469
(58) Field of Search ................................ 370/352, 389, 370/395.1, 395.6, 395.7, 463, 465, 469, 503, 514, 516, 520, 471, 442, 458, 462, 459, 461; 375/219, 220, 362, 368, 371

(56) References Cited

U.S. PATENT DOCUMENTS

| 4,797,815 | A | | 1/1989 | Moore ......................... 710/109 |
| 5,418,786 | A | * | 5/1995 | Loyer et al. .............. 370/395.4 |
| 5,485,456 | A | * | 1/1996 | Shtayer et al. ............ 370/395.1 |
| 5,568,470 | A | * | 10/1996 | Ben-Nun et al. ........... 370/238 |
| 5,719,858 | A | | 2/1998 | Moore ......................... 370/347 |
| 5,754,799 | A | | 5/1998 | Hiles ........................... 710/110 |
| 5,754,941 | A | * | 5/1998 | Sharpe et al. ............... 725/119 |
| 5,784,370 | A | * | 7/1998 | Rich ........................ 370/395.1 |
| 5,875,192 | A | * | 2/1999 | Cam et al. ................ 370/395.7 |
| 5,894,476 | A | * | 4/1999 | Fraser ...................... 370/395.1 |
| 6,307,858 | B1 | * | 10/2001 | Mizukoshi et al. .... 370/395.71 |
| 6,345,052 | B1 | * | 2/2002 | Tse et al. .................. 370/395.6 |
| 6,452,927 | B1 | * | 9/2002 | Rich ........................ 370/395.1 |
| 6,574,228 | B1 | * | 6/2003 | Ganor et al. ............. 370/395.7 |
| 6,680,954 | B1 | * | 1/2004 | Cam et al. .................. 370/474 |
| 6,693,911 | B2 | * | 2/2004 | Yamanaka ................ 370/395.3 |

FOREIGN PATENT DOCUMENTS

EP          0949839 A1 * 10/1999  ........... H04Q/11/04

OTHER PUBLICATIONS

U.S. Appl. No. 09/267,048; filed Mar. 12, 1999, entitled "System and Method for Transmission Between ATM layer Devices and PHY Layer Devices Over a Sserial Bus," to Castellano.
ATM Forum Technical Committee for UTOPIA Level 1, version 2.01, af–phy–0017.000, Mar. 21, 1994.
ATM Forum Technical Committee for UTOPIA Level 2, version 1.0, af–phy–0039.000, Jun. 1995.
"UTOPIA Tutorial", web site pages: http://www.bitgate.de/php.cgi/library/cobutp.pdf, 8.8.01, 19 pages.

* cited by examiner

Primary Examiner—Alpus H. Hsu
(74) Attorney, Agent, or Firm—Thomas, Kayden, Horstemeyer & Risley LLP

(57) ABSTRACT

The current invention provides a system for transmitting and receiving information comprising a first layer transceiver device, a plurality of second layer transceiver devices, and an interface connecting the first layer transceiver device and the a plurality of second layer transceiver devices. The first layer transceiver device and the a plurality of second layer transceiver devices transmit and receive data over the interface and a time division multiplexed (TDM) signal that indicates the availability of one of said second layer transceiver devices.

28 Claims, 10 Drawing Sheets

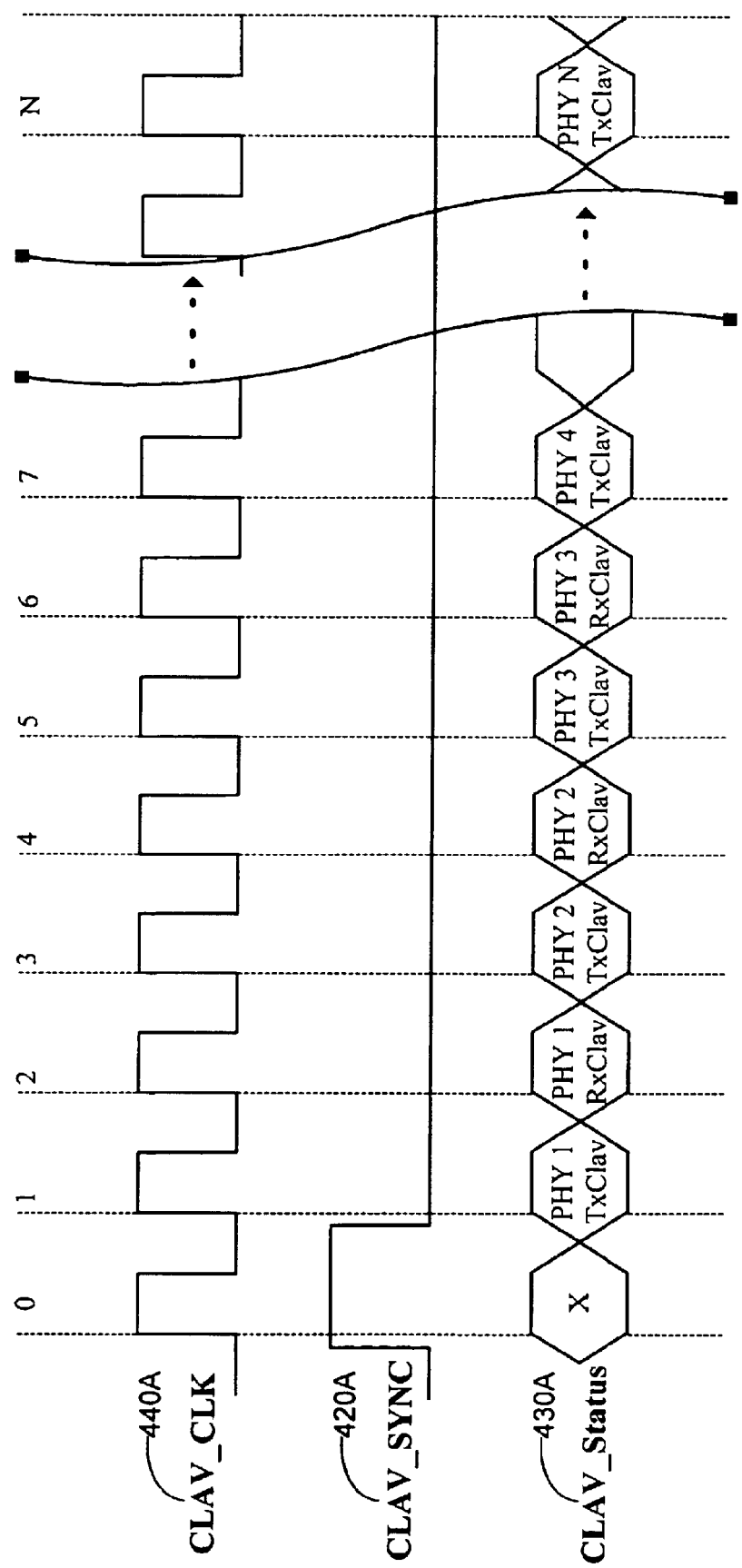

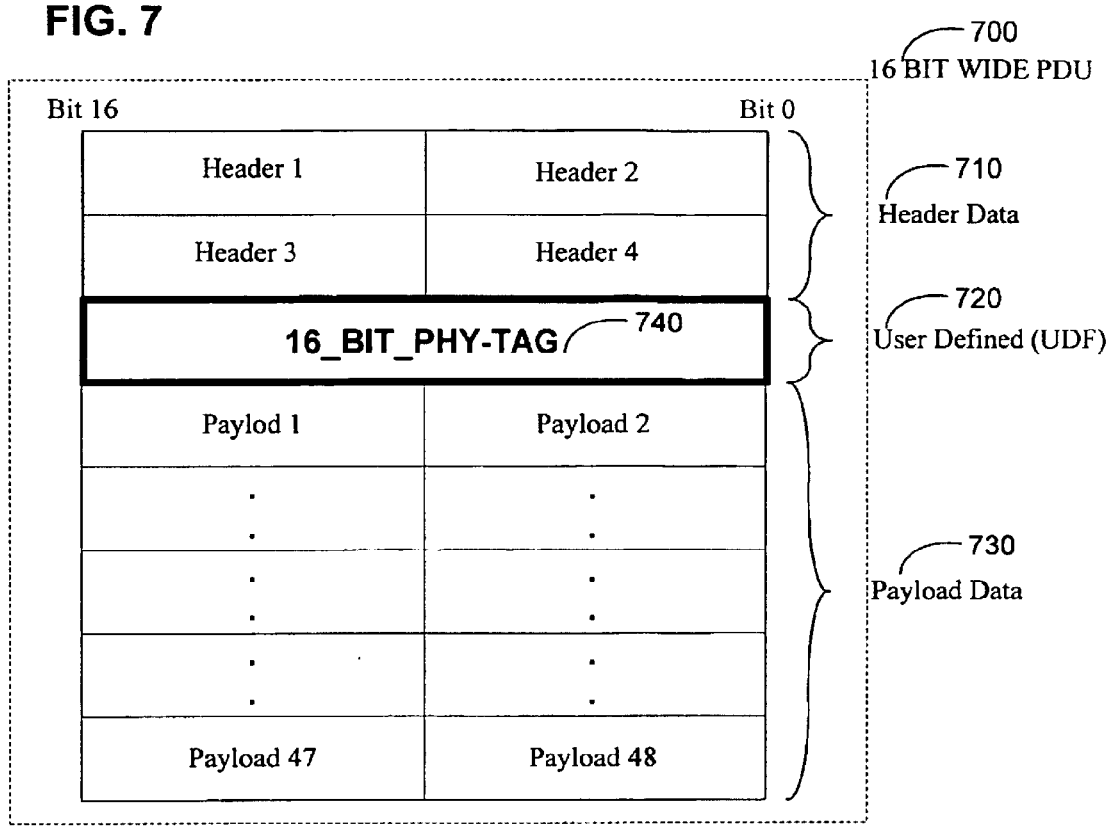
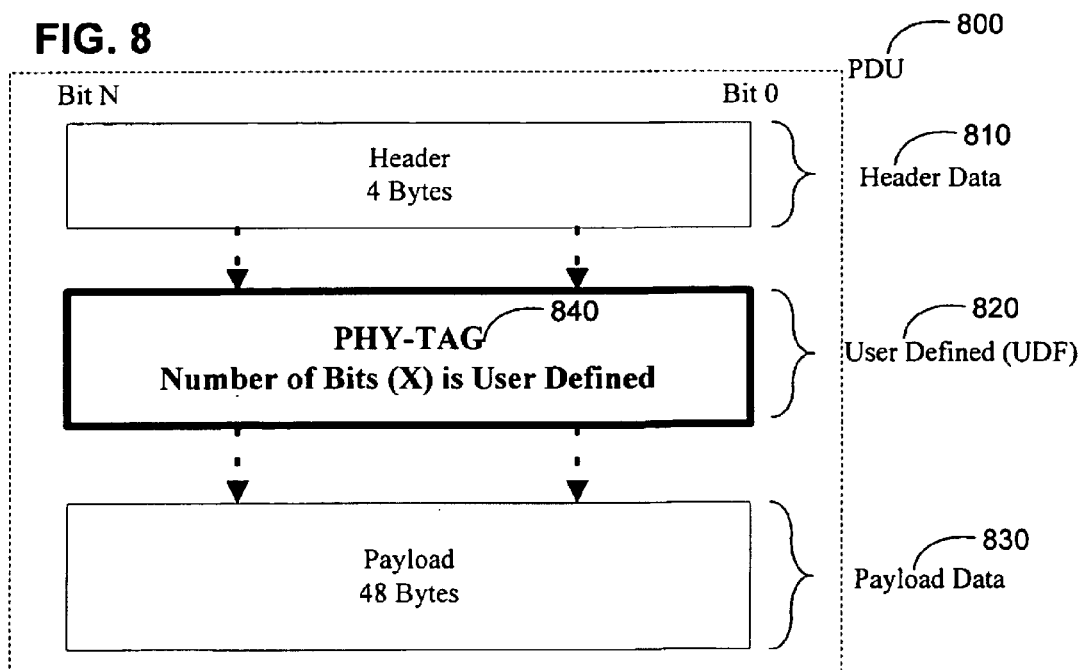

SYSTEM AND METHOD FOR POLLING DEVICES IN A NETWORK SYSTEM

CROSS-REFERENCE TO RELATED APPLICATION

This application claims priority to and the benefit of the filing date of co-pending and commonly assigned Provisional Application having Ser. No. 60/160,127, entitled "Method For Polling ATM Remote Physical Devices in an ATM System," filed Oct. 18, 1999, and hereby incorporated by reference.

TECHNICAL FIELD

The present invention relates generally to the field of communications and computing systems and methods for transmitting and exchanging data between two points, and more specifically, to the field of broadband packet routing and switching and asynchronous transfer mode (ATM) in data communications for transporting information between module layers.

BACKGROUND OF THE INVENTION

Communications networks involve moving information from one entity to another. Communications networks, from the very basic to the highly advanced, require varied information to be grouped at a source entity, transmitted, and then ungrouped at a destination entity. An inherent problem in communications networks involves the process of multiplexing and demultiplexing information to be transmitted. This problem is greatly intensified in high speed networks where rapid processing and transmission requirements magnify the issues surrounding multiplexing and demultiplexing data. In an attempt to address this problem, a plurality of high-speed communications network protocols have adopted complex control signals to control the flow of information. One such net work protocol is asynchronous transfer mode (ATM).

Historically, ATM networks have been some of die few communications networks that support simultaneous transmission of voice, video, and data. The ATM network protocol is a connection-oriented protocol that utilizes short fixed-length packets called "cells". The use of cells allows ATM networks to provide high-throughput, low delay, and service-independent transport. The user of an ATM network is not assigned a static bandwidth as in time division multiplexed systems; the user can obtain dynamically allocated bandwidth and bandwidth on demand. ATM devices typically support network links that carry traffic of a plurality of different protocols at a plurality of different speeds. One ATM node might simultaneously support the data traffic of a plurality of xDSL modems, DS1, DS3, OC-3, OC-12, E1, E3, STM-1, and/or STM-4 connections. The protocol of ATM was designed to facilitate the implementation of varied services in hardware, thus resulting in the ability to quickly process data with little incurred delay. In order to rapidly process the data relating to the multiple subscriber links, the ATM node must have an efficient means by which to interface with these subscriber links. This interface can be described as the interface between the ATM Layer and the Physical Layer.

The ATM protocol has a hierarchical layered structure which is similar to the open systems interconnection (OSI) reference model. The physical layer of the ATM hierarchy corresponds directly to the Physical Layer of the OSI model. The physical layer embodies the manner in which communicating entities interpret the electrical representations of the ones and zeros transmitted and received in a session. Header error control (HEC) functions are also performed by the physical layer. The physical layer interfaces with the ATM Layer. The ATM Layer performs a majority of the functions described in the data link (Layer 2) and Network (Layer 3) of the OSI model. The ATM layer is responsible for receiving data from the physical device, interpreting the source and destination of that data, and muxing the data for transport. In addition, the ATM layers must also demux data and transmit that data to the appropriate physical layers. It is in the ATM layer that virtual path identifiers (VPI) and virtual channel identifiers (VCI) are translated and cell headers are generated or extracted. In the typical case, the ATM Layer can be viewed as the master device controlling a large amount of slave devices, physical layer devices. The resulting network of ATM layer devices and physical layer devices make up the lower level part of a system that is known as the ATM switching system.

The ATM switching system performs the function of receiving ATM cell streams on its interfaces. The ATM switching system independently transmits each cell to a predefined output interface based on input port, ATM cell header, and associated connection. An individual cell that enters an ATM switching system is processed independently based on a service level agreement and the status of the system. The whole of service level agreements in a system dictate policies that are to be carried out in times of congestion. In order to carry out service level agreements and the associated quality of service (QoS) levels, the ATM switching system must be able implement scheduling and buffering techniques to minimize loss and prioritize traffic in the most efficient manner possible. This implementation involves a plurality of considerations, and these considerations are of concern to most standard ATM switching systems.

The standard ATM switching fabric involves an ATM Layer Device which typically processes data at a rate far faster than any of its associated physical (PHY) layer devices. For example, a typical ATM layer traffic processing device operating at rates of 622 Mbps may be employed for ATM traffic processing for DS3 (45 mbps), DS1 (1.544 Mbps), or DSL (144 Kbps to 8 Mbps) ports in a switching system. In this case the high speed ATM layer device can be shared across a multitude of low speed physical layer interfaces. The requirement for sharing the ATM layer across multiple physical layer interfaces is a very typical architecture for an ATM node. ATM switching systems providing large numbers of low/medium speed traffic interfaces can achieve greater port densities at lower cost by sharing the ATM layer over a greater number of port interfaces. For example, in a DSLAM or broadband access concentrator application, the ATM node has a small number of high bandwidth uplinks and a large group of lower bandwidth subscriber links. In this manner, the ATM node multiplexes a plurality of subscriber links onto a high bandwidth link to a larger network. Thereby, the ATM layer device must have the ability to interface with multiple PHY layer devices. The universal test and operations physical interface for ATM (UTOPIA) protocol defines a standard interface between the ATM layer and PHY layer of an ATM switching system. The UTOPIA interface specification defines the control signals to be interchanged between the ATM layer and PHY layer, the timing relationships of control signals and data flow, and the management and control of such an interface. As mentioned earlier, the ATM layer devices multiplex data onto high bandwidth links. In accordance with this characteristic, UTOPIA level 1 was designed to support an 8-bit cell transfer mode to support a single interface at rates up to 155 Mbps (OC-3). The UTOPIA level 2 specification was designed to include a 16-bit cell transfer supporting multiple physical interfaces having a combined line rate up to 622 Mbps (OC-12). In order to interface high speed ATM layer traffic processors and not incur buffer over-run at the PHY layer devices, the UTOPIA specification designates certain flow control signals to be communicated between the two layers. This allows the ATM layer to be rate matched to the PHY layer in order to service the PHY layer at its corresponding transmission rate.

FIG. 1 depicts the flow control signals in accordance with the prior art, UTOPIA Level 1 and 2. The UTOPIA standard specifies an addressing process enabled by a 5 bit addressing signal. A PHY Layer Device 180A is identified in a reception by a 5 bit TxAddr[B:0] 115 signal. A PHY Layer Device 180A is identified in a transmission by a 5 bit RxAddr[B:0] 145 signal. The flow control signals and the data transmissions described by UTOPIA are synchronized by a transmit clock, TxClk 135, and a receive clock, RxClk 165. In the 8-bit mode, the clocking rate is usually 25 Mhz and double that rate, 50 Mhz, for 16-bit mode. An additional synchronization signal indicates the beginning of cell transfer. Start-Of-Cell, TxSOC 125 or RxSOC 155, designates when the data signal, Transmit Data (TxData[A:0]) 110 or Receive Data (RxData[A:0]) 140, contains the first valid byte of a cell. UTOPIA requires a PHY Layer Device to implement rate matching buffers, i.e. FIFO's. Although the PHY Layer Device FIFOs are necessary, they are usually of minimal size (2–4 cells). With such small buffers, the two layers must be able to indicate their respective statuses in order to process communication data successfully. The ATM Layer 101 indicates status by asserting the Transmit Enable, TxEnb 130, signal when TxData 110 contains valid cell data. In addition, the ATM Layer 101 asserts the Received Enable, RxEnb 160, to indicate that RxData 140 and RxSOC 155 will be sampled at the end of the next cycle. The PHY Layer Device communicates status by asserting Cell Available signals. Transmit Cell Available, TxClav 120, is asserted to indicate the PHY Layer Device can accept the transfer of a cell. Receive Cell Available, RxClav 150, is asserted to indicate the PHY Layer has a cell ready for transfer to the ATM Layer.

It is apparent that the aforementioned flow control signals are extensive and can be quite cumbersome on the system as a whole. This complicated flow control is a result of the inherent nature of the ATM protocol. The ATM protocol is a connection oriented, protocol independent, cell based solution. Thus, ATM requires that each cell be independently processed. As technology expands, the cumbersome flow control signals become a more significant problem. As previously mentioned, ATM nodes in broadband network access applications most typically multiplex data from a plurality of low bandwidth subscriber links onto one high bandwidth network link. A typical ATM node is, for example but not limited to, a digital subscriber line access module (DSLAM). A DSLAM might aggregate multiple ADSL G.992.2 (G.Lite) subscribers onto a single OC-12 interface to an upstream network. In this case, the DSLAM would have the bandwidth capacity to multiplex up to 414 G.Lite 1.5 Mbps subscribers on to one 622 Mbps OC-12 interface. Thus, the ATM layer devices of the DSLAM would have to communicate to a large number of the ADSL PHY layer devices. This example illustrates the limitations of the cumbersome flow control requirements of UTOPIA. UTOPIA specifies a 5-bit address field for the PHY Layer Devices. A 5-bit address field results in 32 possible addresses in which one address is reserved for idle transactions. Therefore, an ATM layer device operating in accordance with the UTOPIA specification can only support 31 PHY layer device interfaces. As exemplified by the above DSLAM discussion, this characteristic would be severely limiting for a high bandwidth ATM node attempting to support 411 PHY layer devices. This would require the ATM node to have at least 14 ATM layer devices.

The limitations of the flow control specification within UTOPIA have many significant impacts. The boundary of 31 PHY Layer Devices to a single ATM Layer Device greatly affects the cost of an ATM switching system. The ATM Layer Devices is are fairly costly due to their bandwidth performance, traffic processing and traffic management complexity, and ability to support large amounts of high-speed cell buffers. In view of the ever-increasing processing rates of electronics hardware, it would be extremely costly to have the amount of ATM Layer Devices dictated not by the processing capacity but by the specifications of an interface standard.

Another problem resulting from the UTOPIA limitation is the increase in complexity of the ATM switching system. In the system described above with 14 ATM layer devices, a complex hierarchy of control signals would most likely be required in order manage the processes on the 14 devices. This management would be greatly simplified by reducing the amount of ATM layer devices that are necessary.

SUMMARY OF THE INVENTION

The current invention provides a system for transmitting and receiving information comprising a first layer transceiver device, a plurality of second layer transceiver devices, and an interface connecting the first layer transceiver device and the a plurality of second layer transceiver devices. The first layer transceiver device and the a plurality of second layer transceiver devices transmit and receive information and control signals over the interface to control the transmission and reception of the information. One of these signals is a time division multiplexed (TDM) signal that indicates the availability of one of the second layer transceiver devices. The use of a TDM signal to indicate the availability of a second layer transceiver device greatly reduces the number of distinct control signals required in a system to support a large number of PHY devices across an ATM layer device. It also allows status from the PHY devices to be reported to the ATM layer with a guaranteed latency in a reliable manner. The TDM nature of the signal also allows a plurality of PHY devices partitioned onto multiple components in the system to share the same physical control signals to for reporting PHY status.

Another aspect of the current invention provides a system for transmitting and receiving information comprising a first layer transceiver device, a plurality of second layer transceiver devices, and an interface connecting the first layer transceiver device and a plurality of second layer transceiver devices. The first layer transceiver device and a plurality of second layer transceiver devices transmit and receive said information across said interface in addition to control signals to control the transmission and reception of information over said interface. This information is encapsulated in a protocol data unit (PDU) comprising an address for one of the a plurality of second layer transceiver devices.

Other systems, methods, features, and advantages of the present invention will be or become apparent to one with skill in the art upon examination of the following drawings and detailed description. It is intended that such additional systems, methods, features, and advantages be included within this description, be within the scope of the present invention, and be protected by the accompanying claims. While this invention specifically cites a physical embodiment for controlling traffic between an ATM layer and PHY layer in an ATM switching system it is certainly not limited to that. The mechanisms described herein can certainly be applied to any communications device where multiple LAN or WAN interfaces can be managed by a single high speed instance of the traffic processing device. In this case the protocols described in this invention for allowing multiple physical layer interface devices to indicate their readiness to the traffic processing device for transmission/reception of data and multiplexing of traffic between the PHY layers and traffic layer can be readily applied to ethernet or IP packets, frame relay frames. This technique can be readily used for processing traffic in ethernet switches, gigabit/terabit EP routers and switches, and frame relay switches.

BRIEF DESCRIPTION OF THE SEVERAL VIEWS OF THE DRAWINGS

The accompanying drawings, incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings:

FIG. 5 is a graph depicting the timing relationships of the control signals that are communicated between the ATM Layer CLAV_Status Device and the PHY Layer CLAV_Status Device as shown in FIGS. 4A, 4B, and 4C;

FIG. 7 is a diagram illustrating the addressing system using a 16 Bit data bus and a 16 Bit addressing scheme for the polling system in FIG. 2 according to an embodiment of the present invention;

FIG. 8 illustrates the addressing scheme of an embodiment of the current invention for the polling system in FIG. 2 in which the width of the data bus and the number of addressing bits is defined by the user.

DETAILED DESCRIPTION OF THE INVENTION

Figure 1:
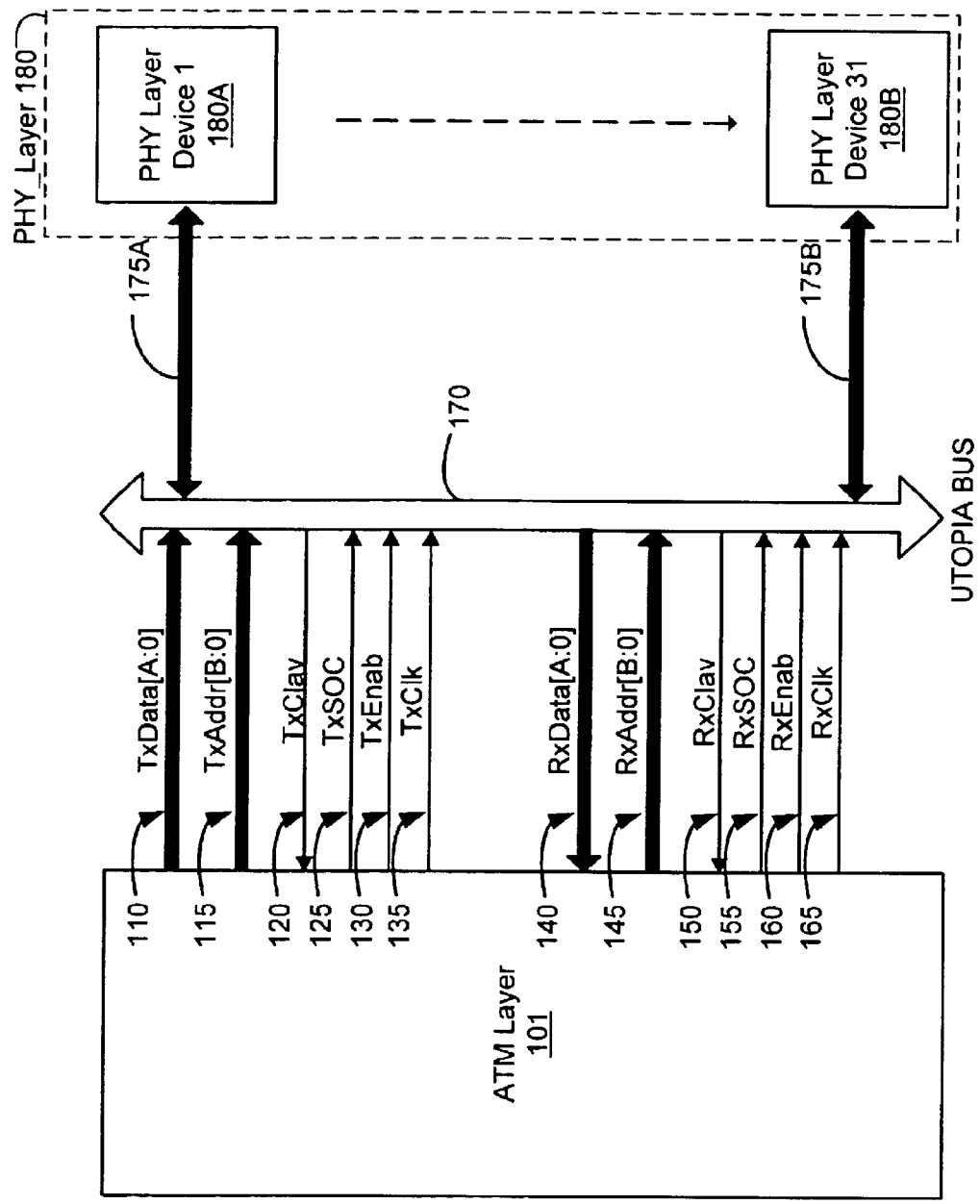
FIG. 1 is a diagram showing the UTOPIA interface signals between the PHY Layer and the ATM Layer in accordance with prior art.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover alternatives, modifications and equivalents included within the spirit and scope of the invention as defined by the appended claims.

Figure 2:
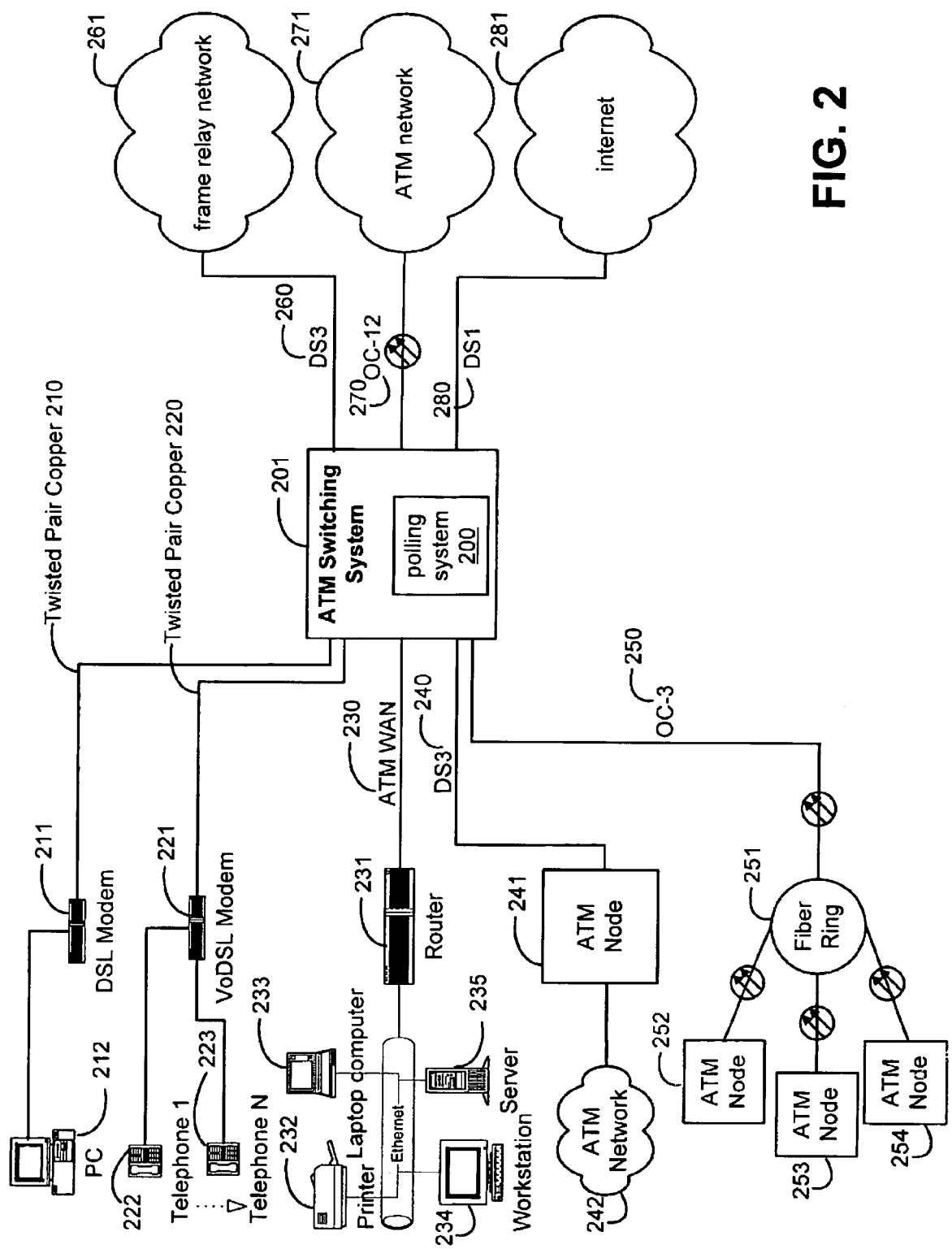
FIG. 2 is a diagram of some of the possible devices and connections that can exist in a network surrounding an ATM switching system containing the current invention, a polling system.

As networking communications rapidly expand, the amount of protocols, interfaces, and system architectures to support these communications expand at the same rapid pace. This phenomenon focuses a spotlight on those network systems that are able in to support fast, reliable, and protocol independent transportation. ATM is a network protocol that embodies these traits. In order to support the vast amount of varied protocols, an ATM switching system must be able to interface to many different types of devices. As illustrated in FIG. 2, a typical ATM switching system 201 has a plurality of different physical interfaces supporting various network protocols. FIG. 2 shows an ATM switching system supporting a DSL Modem 211 connected by a twisted pair copper loop 210. Another type of DSL connection is shown by the VoDSL Modem 221 supporting telephones 222 and 223 over the twisted pair copper connection 220. In addition to DSL service, a typical ATM switching system supports a router 231 via an ATM WAN 230 interface. The ATM switching system 201 in FIG. 2 also serves as a transportation unit for other networks. The ATM switching system 201 supports an additional ATM Network 242 over a DS3 240 interface to an ATM node 241. The optical OC-3 link 250 connects another ATM network, an ATM network interconnected by a fiber ring 251. The ATM switching system 201 supports its subscriber links through WAN connections to other networks. Such WAN connections are typified by a DS3 link 260 to a frame relay network 261, an OC-12 interface to an ATM network 271, and a DS1 280 interface to the internet 281. It is apparent that in order for the ATM switching system 201 to support a large amount of multi-protocol subscriber interfaces, the system must be able to efficiently manage and control these interfaces.

Before continuing the detailed description, it will be useful to set forth some terms and their definitions in this context. A module can be defined as the areas within a protocol. A module being any entity that performs a set of designated functions. The module can be a co-dependent unit within a system or an independent unit with inputs and outputs. A device can be unit within a layer that performs a set of functionality associated with that layer. A transceiver is a unit that is enabled to input and output information. A transceiver, as the word suggests, can both transmit information and receive information. Many different methods can be used by transceivers to communicate data. The transceiver can communicate over, for example but not limited to, a radio, electrical, or optical link. An ethernet is a local area network (LAN) protocol based on a packet frame, usually operating at 10 Mbps. A local area network (LAN) is network of multiple interconnected data terminals or devices within a local area to facilitate data transfer. In contrast a wide area network (WAN) is typically a network of geographically distributed networks that provide high volume trunk links. Internet protocol (IP) is a specification for a particular data unit that is common to many packet delivery services. A protocol data unit (PDU) embodies any grouping of data to be transmitted and received in a specified manner.

Figure 3:
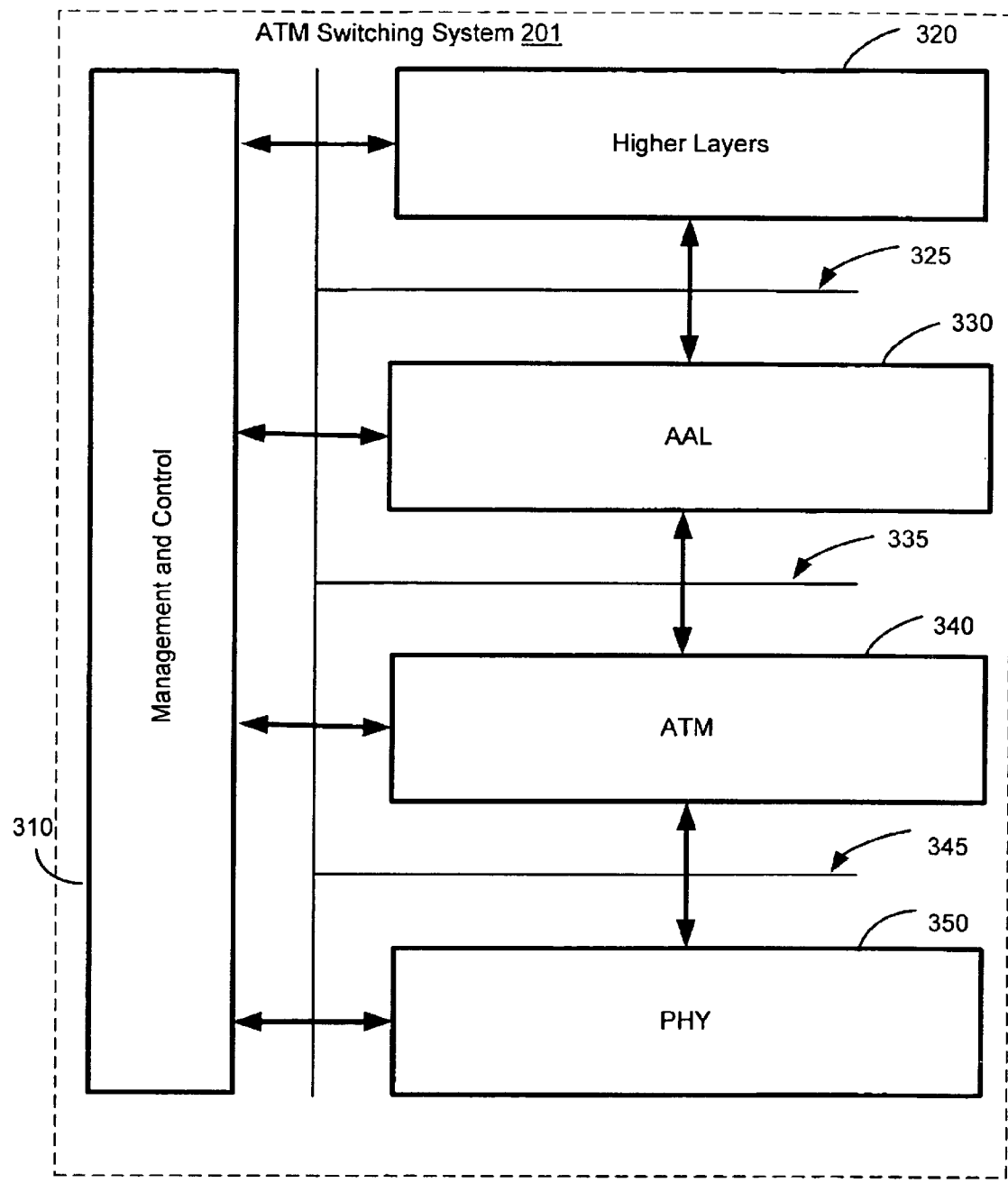
FIG. 3 is a high level diagram of the processing layers and associated interfaces that exist in an ATM switching system displayed in FIG. 2.

The hierarchy of the ATM protocol is depicted in FIG. 3. The ATM model can be broken down into the five areas shown in FIG. 3. The lowest layer of the protocol is labeled as the Physical (PHY) Layer 350. The PHY Layer 350 is the layer that interprets the electrical impulses communicated across the input and output to an ATM system. The PHY Layer communicates its electrical interpretations over the PHY-to-ATM Layer interface 345. This interface 345 transmits data to be processed by the ATM Layer 340 and receives data from the ATM Layer 340 to be outputted by the PHY Layer 350. The ATM Layer 340 interprets and generates the headers of cell traffic. ATM Layer 340 communicates this cell traffic with the ATM Adaptation Layer ("AAL") 330. The AAL Layer 330 is the layer that performs segmentation and reassembly (SAR) and the convergence sublayer (CS) functions. SAR involves segmenting protocol data units (PDUs) from the Higher Layers 320 into ATM appropriate cells and reassembling data from ATM cells into the PDUs of the Higher Layers 320. The SAR and CS processes enable enhanced adaptation of ATM services. The AAL Layer 330 communicates PDUs with the Higher Layers 320 over the AAL-to-Higher Layer Interface 325. The Higher Layers interface with first level applications through the communication of PDUs transmitted and received over the AAL-to-Higher Layer Interface 325. The layers of ATM functionality are centrally controlled by Management and Control 310. An ATM network node typically processes at PHY layer 350 and the ATM layer 340 for the data plane. The other layers are typically performed by the end nodes in the network. The ATM node typically only processes the higher in support of the management and control planes activities.

Figure 4A:
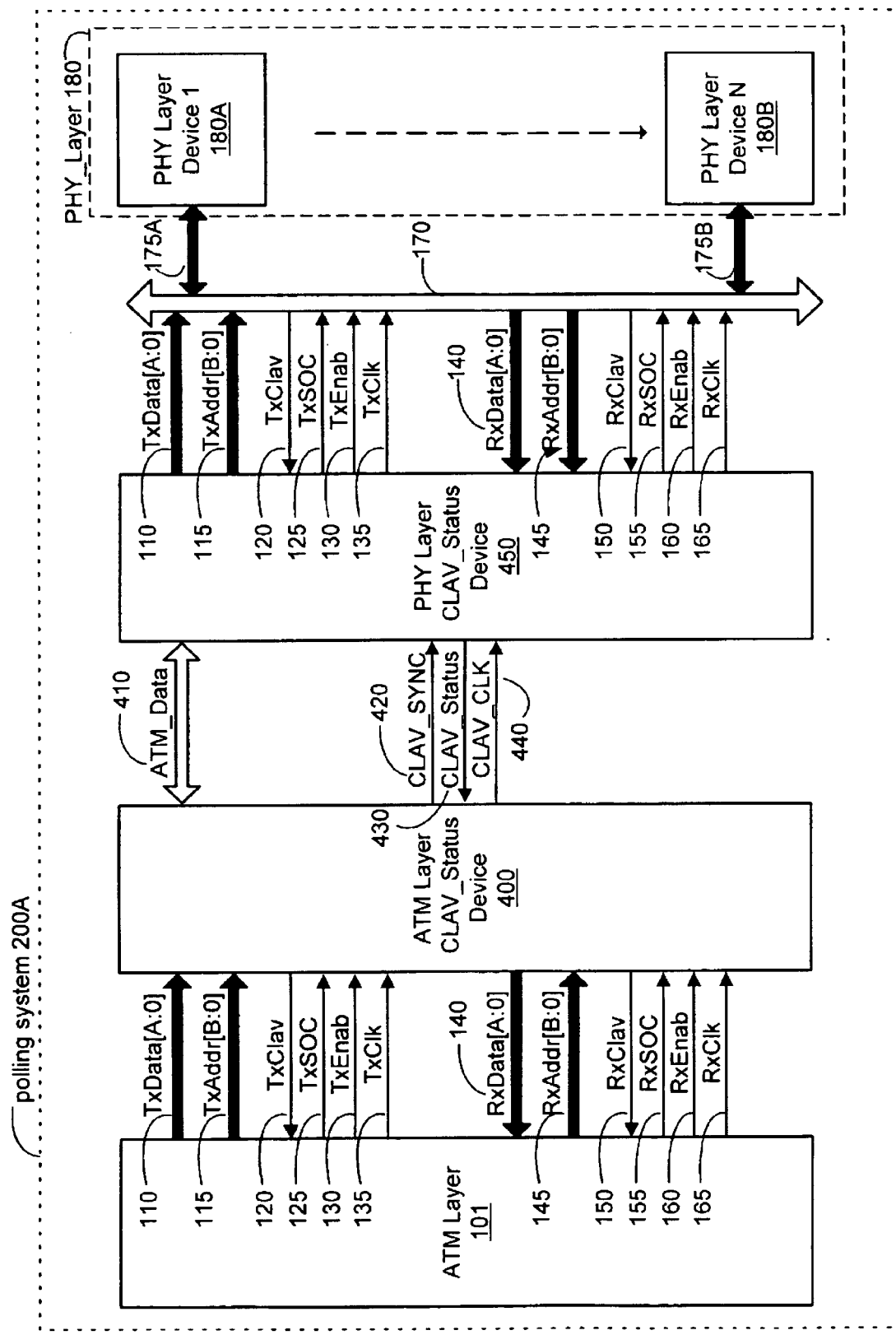
FIG. 4A is a diagram illustrating the polling system in FIG. 2 and the interface signals between communicating layers of one embodiment of the present invention.
Figure 4B:
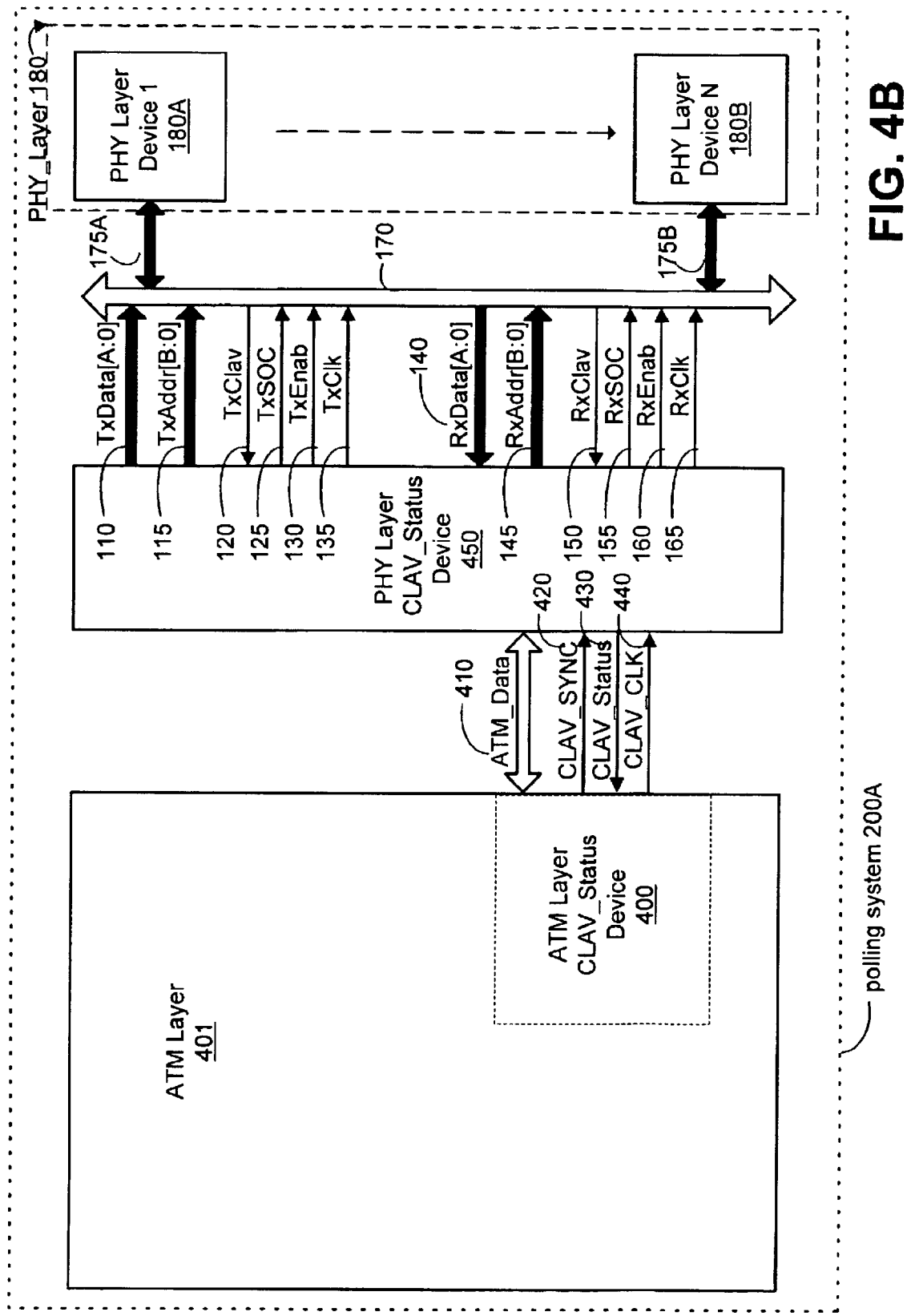
FIG. 4B is a diagram illustrating the polling system in FIG. 2 and the interface signals between communicating layers of an alternate embodiment of the present invention.
Figure 4C:
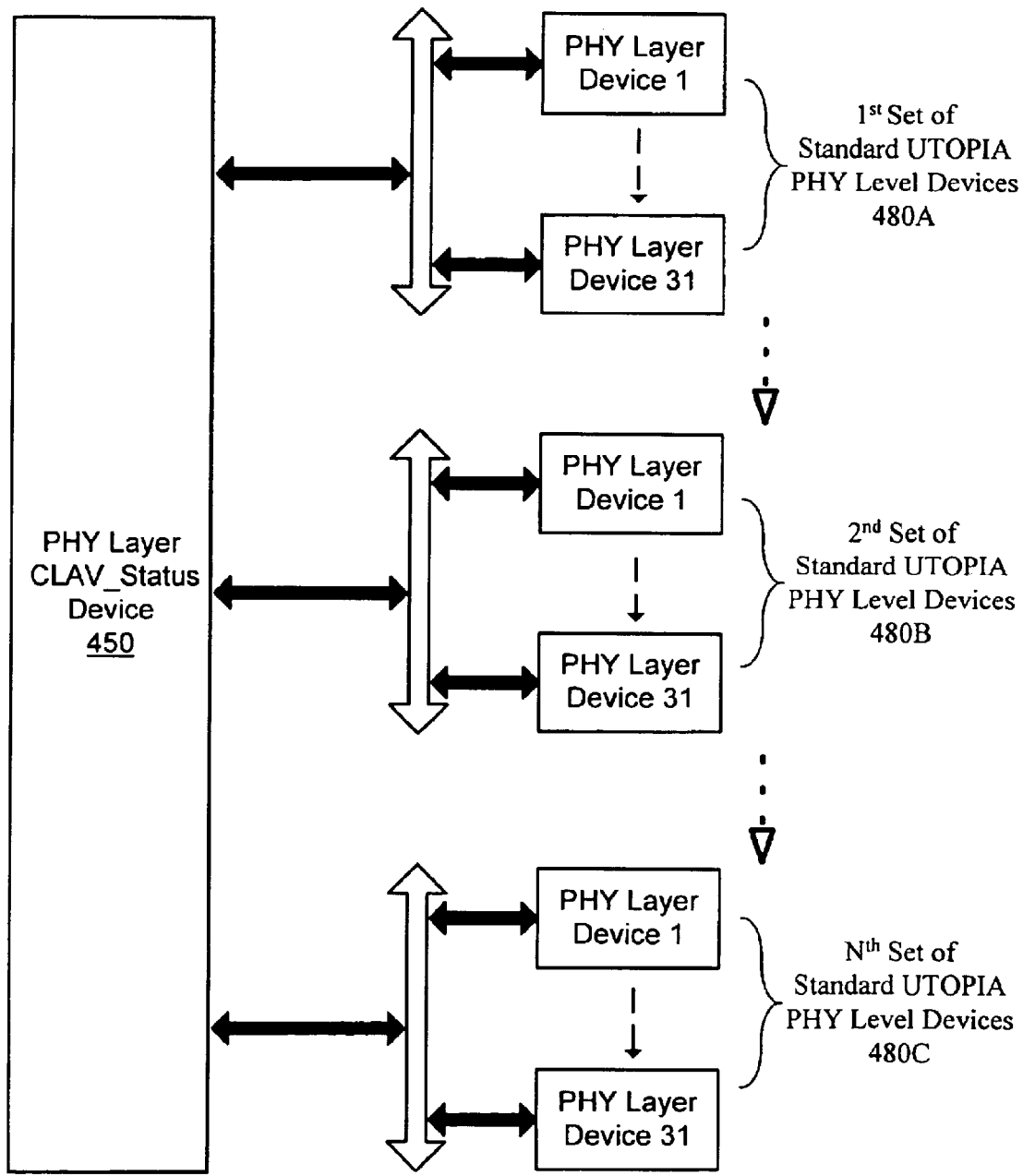
FIG. 4C is a diagram depicting an alternate embodiment of the polling system in FIG. 2 in which the PHY Layer CLAV_Status Device interfaces to a plurality of sets of traditional UTOPIA PHY Layer Devices.

In the manner described above and illustrated by FIG. 3, the ATM switching system 201 (FIG. 2) can manage, process, interpret, and transport information from an electrical signal to a high level PDU and vice versa. It is apparent that the processing required to perform the varied functions of an ATM switching system is demanding. Therefore, it would be advantageous, for a plurality of reasons, to be able to centrally locate a large portion of this processing. FIGS. 4A, 4B, and 4C represent an embodiment of the polling system 200 (FIG. 2) in which the ATM Layer can more efficiently interface with more PHY Layers than possible in the current art.

In FIG. 4A, the ATM Layer CLAV_Status Device 400 communicates the standard UTOPIA control signals and data between ATM Layer CLAV_Status Device 400 and the ATM Layer 101 (FIG. 1). The ATM Layer CLAV_Status Device 400 processes the control signals and data for greater efficiency and speed. In one embodiment the ATM Layer CLAV_Status Device 400 may assimilate the communicated data to adhere to a desired data transport format. One embodiment of such a data transport function may be to implement two separate one directional buses of bit width N, where N is a desired number of bits. Another embodiment may implement ATM_Data 410 as a serial data bus as described in U.S. Pat. No. 6,690,670, issued Feb. 10, 2004, and entitled "System and Method for Transmission between ATM Layer Devices and PHY Layer Devices Over a Serial Bus" which is incorporated herein by reference. In the above embodiments and other potential embodiments, ATM_Data 410 communicates data between the ATM Layer CLAV_Status Device 400 and the PHY Layer CLAV_Status Device 450. In addition to data communication, the ATM Layer CLAV_Status Device 400 may assimilate the control signals communicated with the ATM Layer 101 (FIG. 1). The ATM Layer CLAV_Status Device 400 generates a CLAV_SYNC 420 and a CLAV_CLK 440 signal to be transmitted to the PHY Layer CLAV_Status Device 450. These signals will be described in detail later in the discussion of FIG. 5. The ATM Layer CLAV_Status Device 400 also receives a CLAV_Status 430 signal from the PHY Layer CLAV_Status Device 450 to be communicated to the ATM Layer 101 (FIG. 1). This CLAV_Status 430 signal contains the cell availability information from the PHY devices within the system. The ATM Layer CLAV_Status Device 400 interprets the information communicated in the CLAV_Status signal and generates the appropriate RxClav 150 (FIG. 1) and TxClav 120 (FIG. 1) signals. These RxClav 150 (FIG. 1) and TxClav 120 (FIG. 1) signals are then transmitted to the ATM Layer 101 (FIG. 1).

A system and method for implementing a novel and advantageous PHY Layer addressing scheme is also depicted in FIG. 4A. The ATM Layer CLAV_Status Device 400 not only assimilates control signals communicated regarding cell communication, but the ATM Layer CLAV_Status Device 400 also generates and interprets addressing information. In one embodiment the ATM Layer CLAV_Status Device 400 receives the address on the TxAddr[B:0] 115 (FIG. 1) signal of one of a PHY Layers 180 (FIG. 1) for which the upcoming data on TxData[A:0] 110 (FIG. 1) is destined. The ATM Layer CLAV_Status Device 400 then incorporates this addressing information into the ATM_Data 410 communication. In a similar manner, the ATM Layer CLAV_Status Device 400 pulls addressing information out of a received portion of data in ATM_Data and waits for a corresponding RxAddr[B:0] 145 poll from ATM Layer 101 (FIG. 1) signal to indicate the source PHY Layers 180 data currently being received on RxData[A:0] 140 (FIG. 1). One implementation of the above addressing scheme is embodied in a PHY-Tag 840 (FIG. 8). The use of the PHY-Tag 840 (FIG. 8) involves placing the address for a particular PHY Layer into the user defined area of an ATM cell. The details of this implementation are found in the detailed description of FIG. 7 and FIG. 8.

As previously mentioned one of the elements with which the ATM Layer CLAV_Status Device 400 communicates data and control signals is the PHY Layer CLAV_Status Device 450. The PHY Layer CLAV_Status Device 450 performs functions similar to that of the ATM Layer CLAV_Status Device 400. The data communicated by ATM_Data 410 is processed by the PHY Layer CLAV_Status Device 450 according to the data transport format embodiment discussed above. The PHY Layer CLAV_Status Device 450 pulls the data portion of a received ATM_Data 410 transmission and generates an appropriate TxData[A:0] 10 (FIG. 1) transmission. The PHY Layer CLAV_Status Device 450 also pulls the PHY-Tag 840 (FIG. 8) from the ATM_Data 410 transmission and applies it to the TxAddr[B:0] 115. The PHY Layer CLAV_Status Device 450 also polls PHY Layer devices 180A–180B using TxAddr[B:0] 115 for TxClav status 120. It relays the TxClav status 120 to the ATM Layer CLAV_Status device using the CLAV_Status 430.

The PHY Layer CLAV_Status Device 450 also receives a RxData[A:0] 140 (FIG. 1) transmission from one of the PHY Layers 180 (FIG. 1) and processes the data to be communicated by ATM_Data 410. In conjunction with processing data, the PHY Layer CLAV_Status Device 450 implements the addressing scheme previously described. Thus, in one embodiment the PHY Layer CLAV_Status Device 450 can receive from the PHY Layer 180 (FIG. 1) associated by polling the RxAddr[B:0] 145 (FIG. 1) signal during a data transfer cycle and incorporate that address into the ATM_Data 410 transfer. This address information is embedded in the PHY-Tag 840 (FIG. 8) of the receive ATM_Data 410 transfer.

FIG. 4A illustrates how the PHY Layer CLAV_Status Device 450 receives both a CLAV_SYNC 420 and a CLAV_CLK 440 signal from the ATM Layer CLAV_Status Device 400. The PHY Layer CLAV_Status Device 450 interprets the information communicated in these signals to generate the appropriate control signals to be communicated to the PHY Layers 180. In addition the PHY Layer CLAV_Status Device 450 generates a CLAV_Status 430 signal to be transmitted to the ATM Layer CLAV_Status Device 400. The CLAV_Status 430 signal contains the information regarding the cell availability of the PHY Layers 180 (FIG. 1) in the system. This CLAV_Status signal is described in detail below in the discussion of FIG. 5 and FIG. 6.

FIG. 4B represents one embodiment of the present invention in which the ATM Layer CLAV_Status Device 400 is included as subcomponent of the ATM Layer 401. Those of ordinary skill in the art will recognize that it is possible to change the divisions or combinations of hardware and software functional blocks within a system. In FIG. 4B, the ATM Layer CLAV_Status Device 400 is implemented as a subcomponent of functionality within the ATM Layer 401. It is recognized that the ATM Layer CLAV_Status Device 400 could be implemented in a distinct area of logic within an ATM Layer 401 processing unit. As described earlier, the ATM Layer 401 is a complex processing unit and thus it would be likely for a design to combine the ATM Layer CLAV_Status Device 400 functionality into the logic of the ATM Layer 401. This would allow the ATM Layer 401 to bypass the limitations of UTOPIA control signals and process direct from information communicated by the PHY Layer CLAV_Status Device 450. This embodiment would modify the ATM Layer 401 to incorporate the ATM Layer CLAV_Status Device 450 directly.

It is appreciated by those of ordinary skill in the art that there are many different ways to group the work of different hardware and software modules to achieve an equivalent resulting functionality. One embodiment would enable the present invention to operate with existing standard ATM Layer devices and PHY Layer devices. Another embodiment would allow the ATM Layer CLAV_Status Device 400 to interface with an enhanced ATM Layer 401. The enhancement would comprise added functionality enabled to interpret and create control signals regarding the CLAV_Status input 460. In the case of the CLAV_Status 460, information could be communicated to the ATM Layer 401 to indicate the cell availability status of PHY Layers outside of the existing standard limitations. Thus, the CLAV_Status 460 would potentially carry information about PHY Layer Devices 32 and above, those not included in the standard TxClav 120 (FIG. 1) and RxClav ISO (FIG. 1) signals. For example, but not limited to, the CLAV_Status 460 signal would communicate information which is not supported by the standard control signals interfaces to the ATM Layer 101 (FIG. 1). One embodiment of the CLAV_Status 460 signal would communicate information for which it is not possible or not desired to communicate over the standard UTOPIA bus.

Another embodiment of the polling system 200 (FIG. 2) could involve communicating a special CLAV_Status cell. In this case, the ATM Layer CLAV_STATUS device would consolidate the TDM CLAV_Status from the PHY Layer CLAV_STATUS devices. It would then create a special CLAV_Status cell that is transmitted to the ATM Layer device. In this case the CLAV_Status cell could be included in the data stream and the information within this special data cell would be used to define cell availability characteristics of the PHY Layer 180 (FIG. 1). This allows the existing ATM layer interface to handle the expanded PHY devices without requiring a special CLAV_STATUS interface.

FIG. 4C is a diagram that demonstrates a significant embodiment of the polling system 200 (FIG. 2). In FIG. 4C the PHY Layer CLAV_Status Device 450 controls the control signals and data flow to a 1st Set of Standard UTOPIA PHY Layer Devices 480A, a 2nd Set of Standard UTOPIA PHY Layer Devices 480B, and a Nth Set of Standard UTOPIA PHY Layer Devices 480C. One embodiment of the present invention enables the PHY Layer CLAV_Status Device 450 to create the standard UTOPIA control signals. This implementation would involve the PHY Layer CLAV_Status Device 450 transmitting and receiving the control signals illustrated in the prior art, UTOPIA. One advantage of this implementation is that the PHY Layer CLAV_Status Device 450 could control the control signals and data flow of many times more PHY Layer Devices than possible under the current UTOPIA specifications. Thus, instead of interfacing with one set of 31 PHY Layer Devices, the system could interface with many times more than 31 PHY Layer Devices that are arranged in groups of the standard 31. Another advantage of such an embodiment of the polling system 200 (FIG. 2) is that the PHY Layer Devices would not have to be adapted in any way. Employing the above embodiment of the present invention would allow a system to easily interact with any PHY devices complying with the UTOPIA standards. The system of the present invention could enable the advantages discussed above without modification to PHY Layer Devices.

Figure 4D:
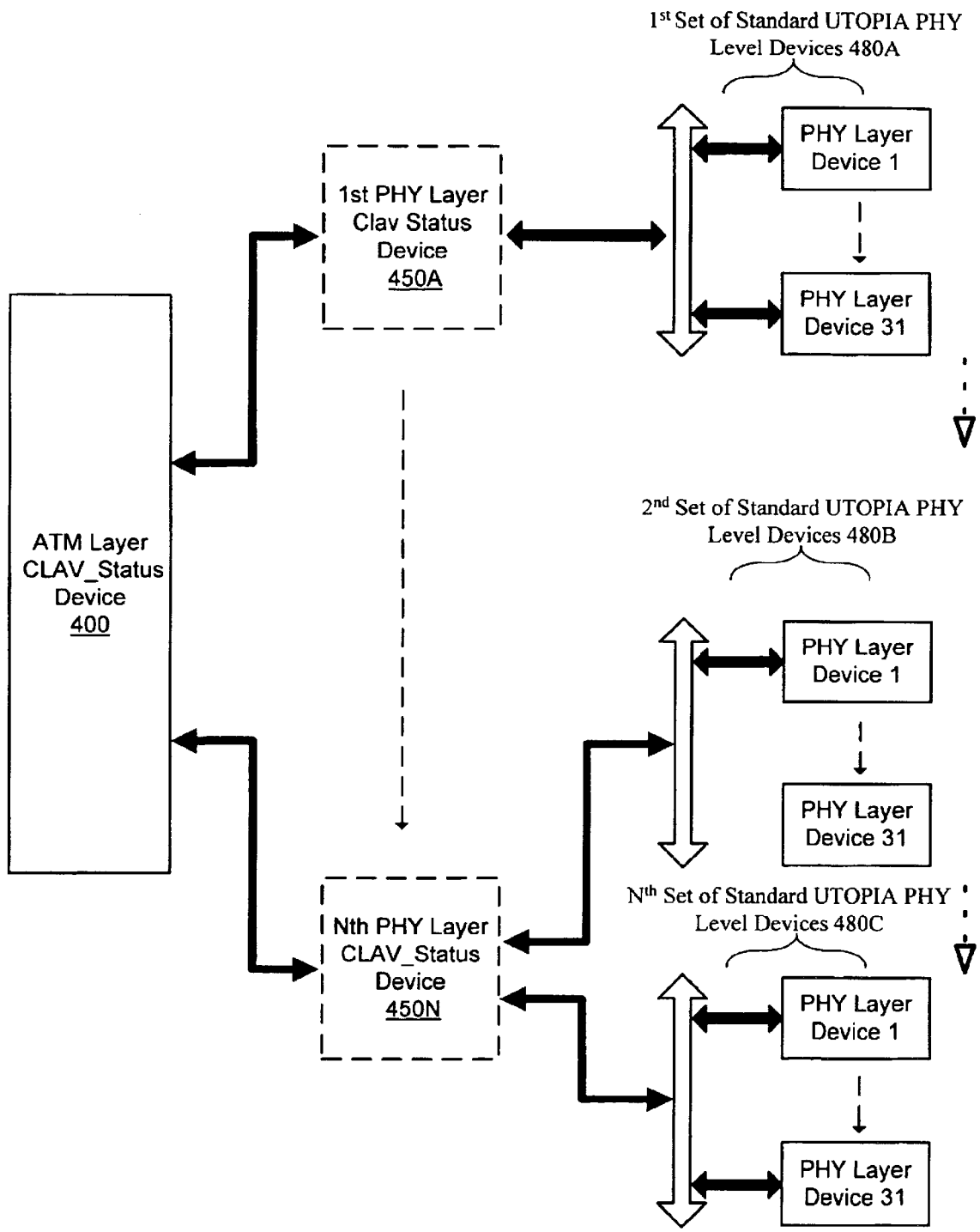
FIG. 4D is a diagram depicting an alternate embodiment of the polling system in FIG. 2 in which the PHY Layer CLAV_Status Device is partitioned into a plurality of Sub PHY Layer CLAV_Status Devices which interface with sets of traditional UTOPIA PHY Layer Devices.

FIG. 4D shows an alternative embodiment of FIG. 4C in which the PHY Layer CLAV_Status Devices 450 can be partitioned into multiple instances allowing greater scalability. As shown in FIG. 4D, the ATM Layer CLAV Status Device 400 can interface to multiple PHY Layer CLAV Status Devices 450A–450N. In this case each PHY Layer CLAV Status device 450A–450N relays CLAV status from its respective set of UTOPIA PHY layer devices 480A–480C to the ATM Layer CLAV Status Device 400. The PHY Layer CLAV Status 450A–450N may support 1 or more standard UTOPIA buses. In this example, the $1^{st}$ PHY Layer CLAV Status device 450A supports the $1^{st}$ set of Standard UTOPIA PHY Level Devices 480A, and the Nth PHY Layer CLAV Status device 450N supports the $2^{nd}$ Set of Standard UTOPIA PHY Level Devices 480B through the Nth 480C Set of Standard UTOPIA PHY Level Devices. CLAV Status from each of the PHY Layer CLAV Status devices is aggregated to the ATM Layer CLAV Status device by utilizing the TDM control protocol of the CLAV Status Bus (signals 420, 430, and 440). Each PHY Layer CLAV Status device is assigned time slots on the TDM CLAV Status Bus for the respective PHY Layer devices 480. Synchronization between PHY Layer CLAV Status Devices 450A–450N is maintained by CLAV_CLK 420 and CLAV_SYNC 440. During a time slot in which status for a particular PHY Layer Device 480 is driven onto the bus, the associated PHY Layer CLAV Status 450A–450N drives the CLAV_Status signal 430. The remaining PHY Layer CLAV Status Devices 450A 450N that are not responsible for the associated PHY Layer device 480 remain in a tri-state mode.

It is respectfully asserted that one ordinary skilled in the art would recognize that the plurality of PHY Layer CLAV_Status Devices (450A–450N) could be modules within a single PHY Layer CLAV_Status Device 450 or separate entities. This partitioning allows for easy, rapid, and manageable scaling of a hierarchy for greater efficiency.

FIG. 5 is a diagram illustrating the timing relationships of the signaling communicated between the ATM Layer CLAV_Status Device 400 (FIG. 4A) and the PHY Layer CLAV_Status Device 450 (FIG. 4A). The timing diagram shown in FIG. 5 is of an arbitrary time scale and the curved lines toward the end of the diagram indicate a break in the time sequence. The CLAV_CLK 440A signal is the reference clock for which the cell availability signaling is referenced. The CLAV_SYNC 420A signal is a signal generated to demarcate the beginning of a cell availability report period. The CLAV_Status 430A signal is a time division multiplexed signal that contains the cell availability of the PHY Layers 180 (FIG. 1). One time slot is used to indicate TXCLAV status 120, another time slot may be used to indicate RXCLAV status 150. The PHY Layer CLAV_Status Device 450 (FIG. 4A) monitors the CLAV_SYNC signal 420A to determine when it should begin a period of reporting the cell availability status of the PHY Layers 180 (FIG. 1). When the CLAV_SYNC 420A signal is asserted, as shown at clock edge 0, then the PHY Layer CLAV_Status Device 450 (FIG. 4A) begins to write cell availability information to the CLAV_Status 430A signal. In one embodiment, depicted in FIG. 5, the PHY Layer CLAV_Status Device 450 (FIG. 4A) writes the TXClav cell availability of PHY Layer 1 180A (FIG. 1) at clock edge 1 to CLAV_Status 430A. Next, the PHY Layer CLAV_Status Device 450 (FIG. 4A) writes the RXClav cell availability of PHY Layer 1 at clock edge 2 to CLAV_Status 430A. At clock edge 3 Layer CLAV_Status Device 450 (FIG. 4A) writes the TXClav cell availability of PHY Layer 2 180A (FIG. 1) to CLAV_Status 430A. Next, the PHY Layer CLAV_Status Device 450 (FIG. 4A) writes the RXclav cell availability of PHY Layer 2 at clock edge 4 to CLAV_Status 430A. In this manner the PHY Layer CLAV_Status Device 450 (FIG. 4A) writes the cell availability information of the PHY Layers 180 (FIG. 1) to the CLAV_Status signal in succession. One embodiment of the invention implements the CLAV_Status write procedure by using the PHY Layer's 180 (FIG. 1) addresses. In accordance with prior art, namely the UTOPIA Level 2 specification, a PHY Layer is assigned an address by a management entity. The PHY Layer CLAV_Status Device 450 (FIG. 4A) uses these addresses to create a time delay factor. Thus PHY Layer 1 180A (FIG. 1) has its TXClav and RXClav cell availability status written to the CLAV_Status after zero and one clock cycle delays. PHY Layer 2 has its cell availability status written to the CLAV_Status 430A signal after a delay of two and three clock cycles. PHY Layer N 180B (FIG. 1) has its cell availability status written to the CLAV_Status 430A signal after a delay of (2*N−2) and (2*N−1) clock cycles. The following formulas define the delay calculation used in this embodiment:

Clock Cycle to Write to TXCLAV CLAV_Status=2*PHY Layer address-2

Clock Cycle to Write to RXCLAV CLAV Status=2*PHY Layer address-1

The PHY Layer CLAV_Status Device 450 (FIG. 4A) may thereby use the addresses assigned to the PHY Layers 180 (FIG. 1) to create a time division multiplexed CLAV_Status signal 430A. It also asserted that one skilled in the art may ascertain another algorithm for assigning time slots for reporting CLAV Status to respective PHY layer devices.

Figure 6:
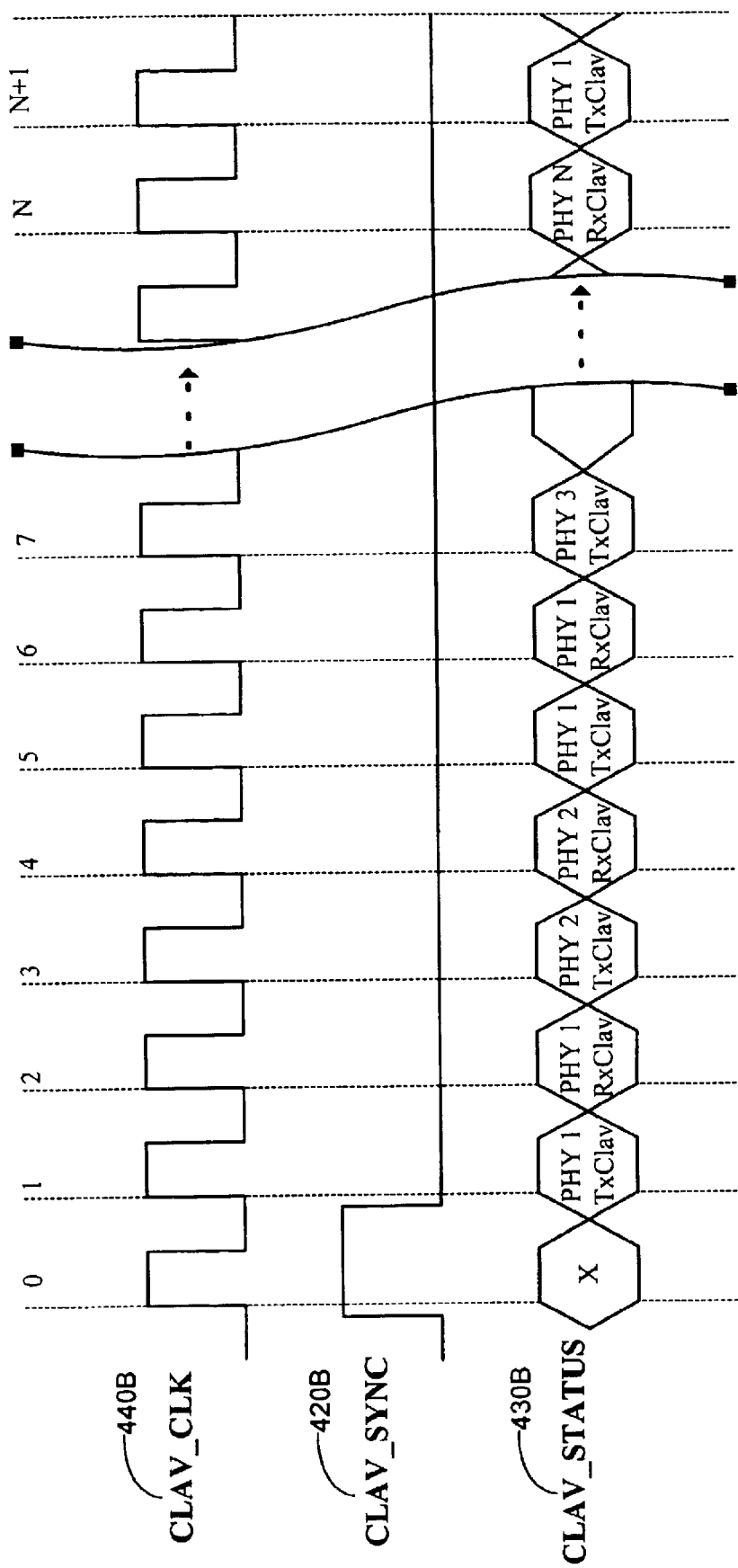
FIG. 6 is a graph of the timing relationships in which one PHY device operates at a higher speed relative to the other PHY devices in the system according to an embodiment of the present invention as shown in FIGS. 4A, 4B, and 4C.

FIG. 6 illustrates another embodiment of the timing relationships of the signaling communicated between the ATM Layer CLAV_Status Device 400 (FIG. 4A) and the PHY Layer CLAV_Status Device 450 (FIG. 4A). The timing diagram shown in FIG. 6 demonstrates a modification to the signaling techniques described in FIG. 5. As previously mentioned, it is typical for an ATM system to service many different types of subscriber links that operate at many different speeds. This variance in subscriber speeds necessitates that different PHY Layers operate at different speeds. Thereby, the ATM system must be able to handle data and signaling operating at varying rates of speed. FIG. 6 illustrates one embodiment of the Polling System 200 (FIG. 2) in which a higher speed PHY Layer has its cell availability status written to the CLAV_Status 430B more often than the other lower speed PHY Layers. The timing diagram shown in FIG. 6 is of an arbitrary time scale and the curved lines toward the end of the diagram indicate a break in the time sequence. As shown in FIG. 6, the CLAV_SYNC 420B is asserted at clock edge 0. Responsive to this sync signal, the PHY Layer CLAV_Status Device 450 (FIG. 4A) writes the TXCLAV cell availability of PHY Layer 1180A (FIG. 1) to the CLAV_Status 430B signal at clock edge 1. At clock edge 2, the PHY Layer CLAV_Status Device 450 (FIG. 4A) writes the RXCLAV cell availability of PHY Layer 1. At clock edge 3, the PHY Layer CLAV_Status Device 450 (FIG. 4A) writes the TXCLAV cell availability of PHY Layer 2. At clock edge 4, the PHY Layer CLAV_Status Device 450 (FIG. 4A) writes the RXCLAV cell availability of PHY Layer 2. Next, the PHY Layer CLAV_Status Device 450 (FIG. 4A) again writes the TXCLAV cell availability of PHY Layer 1180A (FIG. 1) to CLAV_Status 430B that exists at clock edge 5. In the example set forth by FIG. 6, PHY Layer 1180A (FIG. 1) is a much higher speed device than the other PHY Layers 180 (FIG. 1) and thus requires to have its cell availability status transmitted more than the others. The modification exemplified in FIG. 6 creates a time division multiplexed CLAV_Status 430B signal in which priorities are exercised by the PHY Layer CLAV_Status Device 450 (FIG. 4A) and higher speed PHY Layers are allocated more time slots.

FIG. 5 and FIG. 6 illustrate how a TDM sync signal (CLAV_SYNC 420) can be used to define a sync period. This sync period is the time period necessary for the PHY devices in a system to transfer their TxClav/RxClav signal status. One embodiment of the present invention implements the length of the sync period to be equal to the number of PHY devices in the system. For example, if there are 8 PHY devices in the system then the sync period would be 8 clock cycles long. A further extension on one embodiment of the polling system 200 (FIG. 2) would be to allow the length of the sync period to dynamically change responsive to the addition and deletion of PHY devices to the system. In accordance with the discussion of FIG. 6, another embodiment of the polling system 200 (FIG. 2) could result in allowing particular PHY devices to report more than once in a sync period. For one embodiment example, consider a system in which there is a combination of DS1 PHY devices (1.544 Mbps) and DS3 PHY devices (44.1236 Mbps) and a cell is a standard 53 byte ATM cell. A DS1 interface has a transfer rate of 3.6K cells/second, or 1 cell every 277 $\mu$s. A DS3 transfers a cell every 9 $\mu$s (microseconds). Suppose in this example a 25 Mhz clock is used to support cell availability polling of 512 PHY devices. Thus, there is a clock edge every 40 ns (nanosecond). With 512 PHY devices, one frame of the sync period is 20 us long. In this implementation, the 20 µs frame time is enough to meet the response time requirements of a DS1 PHY device with the potential to transmit 1 cell every 277 us. However, the 20 us frame time is too slow to support the response time requirements of a DS3 device with the potential to transmit or receive a cell every 9 us. To meet the response time requirements the system will have to take advantage of the system and method of one of the embodiments of the polling system 200 (FIG. 2) previously described in the discussion of FIG. 6. The implementation can meet the response time requirements of the DS3 by allowing the DS3 PHY devices to report to CLAV_Status a plurality of times during the sync period. If the DS3 channel applied CLAV_Status 28 times per frame, response time would be approximately 731 ns.

FIG. 7 illustrates one embodiment of the present invention with respect to a novel and advantageous addressing scheme. The diagram in FIG. 7 depicts the format of a data Protocol Data Unit (PDU) to be communicated on ATM_ Data 410 (FIG. 4A). In this embodiment, the data PDU is 16 Bits wide, 16 BIT WIDE PDU 700, and carries information that can be broken down into three main sections. These sections are Header Data 710, User Defined (UDF) 720, and Payload Data 730. In this embodiment the Header Data 710 section and the Payload Data 730 are not modified from the standard in the art. The present invention implements an addressing scheme by making use of the UDF 720 section. One embodiment of the polling system 200 (FIG. 2) creates a 16_BIT_PHY_TAG 740 to be placed in the UDF 720 section. This UDF 720 section is 16 bits wide and thus the 16_BIT_PHY_TAG 740. This implementation creates an address for a PHY Layer that can be wide as the 16_BIT_ PHY_TAG 740, which in this case means up to 2^6, 65536, distinct addresses can be created. The system uses this tag to implement addressing in the following manner. When the ATM Layer CLAV_Status Device 400 (FIG. 4A) communicates a 16 Bit Wide PDU 700, it creates or interprets a 16_BIT_PHY_TAG 740 to indicate the source PHY device or the destination PHY device. Also, when the PHY Layer CLAV_Status Device 450 (FIG. 4A) communicates a 16 Bit Wide PDU 700, it creates or interprets a 16_BIT_ PHY_TAG 740 to indicate the source PHY device or the destination PHY device. This embodiment enables an inband addressing method that requires no extra addressing measures and every data PDU is directly associated with address of PHY device from which it came or for which it is destined.

FIG. 8 exhibits an embodiment of the present invention in which the PDU 800 width and PHY_TAG 840 are of undefined lengths. This figure illustrates how the method of data transfer and addressing described in earlier discussions can be implemented to adhere to requirements of a particular design. The PDU 800 is of width N, where N can be a value that best matches the requirements of the design. For example but not limited to, if the design required a large data transport size then N could equal 64 and the data bus would be 64 bits wide. This embodiment also calls for the PHY_ TAG 840 to be of length X, where X is defined by the requirements of the design at hand. The number of possible PHY devices to be addressed can be changed by changing the value of to X, thereby make the PHY_TAG 840 larger or smaller.

It is respectfully asserted that the embodiments of the polling system above are applicable to a variety of protocols. The discussion above focused on the polling system as implemented in an ATM environment and more specifically UTOPIA. One skilled in the art will recognize the application of the polling system in protocols such as ethernet, IP, MPLS, frame relay, or any protocol in which a controlling traffic processing device communicates data with a plurality of other physical interface devices in the system. As previously mentioned the polling system addresses the problem of having cumbersome flow control signals when pluralities of devices are trying to communicate. This cumbersome flow control signal problem exists in a plurality of circumstances with a plurality of protocols and the polling system method can be applied to these circumstances and protocols.

In all embodiments of the present invention, as described in detail in this disclosure, there is transmission and reception. It is respectfully asserted that anyone of ordinary skill in the art will recognize that one of these sides of data flow or control signals could be deleted from the system. For example, in many ATM switching systems the ATM layer processing bandwidth is greater than the total of the maximum potential bandwidths for the subscriber links. In this circumstance, it would not be necessary to have control signals for data coming from the PHY Layer because the ATM Layer would be able to handle the data. Similarly many other embodiments can be construed of the present invention in which only transmission or only reception considerations are of concern. In any manner, all embodiments still use the teachings set forth by the polling system 200 (FIG. 2).

The polling system 200 (FIG. 2) of the present invention can be implemented in hardware, software, firmware, or a combination thereof. In the preferred embodiment(s), the polling system 200 (FIG. 2) is implemented in software or firmware that is stored in a memory and that is executed by a suitable instruction execution system If implemented in hardware, as in an alternative embodiment, the polling system 200 (FIG. 2) can implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

The flow chart of FIG. 3 shows the architecture, functionality, and operation of a possible implementation of the ATM switching system 201 (FIG. 2) software. In this regard, each block represents a module, segment, or portion of code, which comprises one or more executable instructions for implementing the specified logical function(s). It should also be noted that in some alternative implementations, the functions noted in the blocks might occur out of the order noted in FIG. 3. For example, two blocks shown in succession in FIG. 3 may in fact be executed substantially concurrently or the blocks may sometimes be executed in the reverse order, depending upon the functionality involved, as will be further clarified herein below.

A program to implement the polling system 200 (FIG. 2), which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled. In concluding the detailed description, it should be noted that it will be obvious to those skilled in the art that many variations and modifications can be made to the preferred embodiment without substantially departing from the principles of the present invention. All such variations are intended to be included herein within the scope of the present invention, as set forth in the following claims.

What is claimed is:

1. A system for transmitting and receiving information, said system comprising:
    a first layer transceiver device;
    a plurality of second layer transceiver devices; and
    an interface connecting said first layer transceiver device and said plurality of second layer transceiver devices,
    wherein said first layer transceiver device and said plurality of second layer transceiver devices transmit and receive said information across said interface,
    wherein said information comprises data and a time division multiplexed (TDM) signal,
    wherein said TDM signal indicates the availability of one of said second layer transceiver devices; and
    wherein one of the plurality of second layer transceiver devices is granted access to write said availability based on a detection of assertion of a synchronization signal followed by expiration of a certain amount of delay.

2. The system of claim 1, wherein said TDM signal comprises a transmit available indicator of whether one of said plurality of second layer transceiver devices can receive said information from first layer transceiver.

3. The system of claim 1, wherein said TDM signal comprises a receive available indicator of whether one of said plurality of second layer transceiver devices can transmit said information to first layer transceiver.

4. The system of claim 1, wherein said certain amount of delay is a calculated amount of clock edges after assertion of said synchronization signal, said calculated amount equal to an address of said first second layer transceiver device minus one.

5. The system of claim 1, wherein said plurality of conditions comprises a speed access variable, said speed access variable allowing a high speed transceiver of said second layer transceiver device to write said availability multiple times during a synchronization period.

6. The system of claim 1, wherein said TDM signal is transmitted and received in-band along with said data over a data stream.

7. The system of claim 1, wherein said TDM signal is transmitted and received out-of-band from said data in a plurality of separate signals.

8. A system for transmitting and receiving information, said system comprising:
    an ATM layer transceiver device;
    a plurality of physical layer transceiver devices; and
    an ATM to physical layer interface module connecting said ATM layer transceiver device and said plurality of physical layer transceiver devices,
    wherein said ATM layer transceiver device and said plurality of physical layer transceiver devices transmit and receive data across said ATM to physical layer interface module using a first plurality of data signals and a first plurality of control signals, wherein at least one of said first plurality of control signals is a time division multiplexed signal,
    wherein said ATM to physical layer interface module comprises:
    an ATM layer cell availability status device;
    and a physical layer cell availability status device,
    wherein said ATM layer cell availability status device communicates with said ATM layer transceiver device using a second plurality of data signals and a second plurality of control signals, said second plurality of control signals distinct from first plurality of control signals.

9. The system of claim 8, wherein said time division multiplexed signal indicates the cell availability of one of said physical layer transceiver devices.

10. The system of claim 8, wherein said time division multiplexed signal comprises a transmit cell available (TXClav) indicator of whether one of said plurality of physical layer transceiver devices can receive said information.

11. The system of claim 8, wherein said time division multiplexed signal comprises a receive cell available (RxClav) indicator of whether one of said plurality of physical layer transceiver devices can transmit said information.

12. The system of claim 8, wherein a first physical layer transceiver device of said plurality of physical layer transceiver devices is granted access to write said availability to said time division multiplexed signal, said access based upon a plurality of conditions.

13. The system of claim 12, wherein said plurality of conditions comprises a synchronization signal being detected as asserted on the edge of a reference clock and a certain amount of delay being expired.

14. The system of claim 13, wherein said certain amount of delay is a calculated amount of clock edges after assertion of said synchronization signal.

15. The system of claim 13, wherein said calculated amount is equal to an address of said first physical layer transceiver device minus one.

16. The system of claim 8, wherein said ATM to physical interface module comprises a ATM layer cell availability status device and a physical layer cell availability status device.

17. The system of claim 8, wherein said ATM layer cell availability status device communicates with said ATM Layer and said physical layer cell availability status device.

18. The system of claim 17, wherein said communication between said physical layer cell availability status device and said ATM layer cell availability status device comprises a plurality of interface control signals and interface data.

19. The system of claim 18, wherein a first of said plurality of interface control signals is said TDM signal.

20. The system of claim 19, wherein a second of said plurality of control signals is said synchronization signal and a third of said plurality of control signals is said reference clock.

21. The system of claim 20, wherein said interface data is a protocol data unit (PDU).

22. The system of claim 21, wherein said PDU comprises a header portion, a user defined (UDF) portion, and a payload portion.

23. The system of claim 22, wherein said UDF portion comprises an address of one of said plurality of physical layer devices.

24. A method for transmitting and receiving information, said method comprising steps of:
   implementing a first layer transceiver device;
   implementing a plurality of second layer transceiver devices; and
   providing an interface connecting said first layer transceiver device and said plurality of second layer transceiver devices, wherein said first layer transceiver device and said plurality of second layer transceiver devices transmit and receive said information across said interface, wherein said information comprises data and a time division multiplexed (TDM) signal, wherein said TDM signal indicates the availability of one of said second layer transceiver devices; and
   wherein one of the plurality of second layer transceiver devices is granted access to write said availability based on a detection of assertion of a synchronization signal followed by expiration of a certain amount of delay.

25. The method of claim 24, wherein said TDM signal comprises a transmit available indicator of whether one of said plurality of second layer transceiver devices can receive said information.

26. The method of claim 24, wherein said TDM signal comprises a receive available indicator of whether one of said plurality of second layer transceiver devices can transmit said information.

27. The method of claim 24, wherein said certain amount of delay is a calculated amount of clock edges after assertion of said synchronization signal, said calculated amount equal to an address of said first second layer transceiver device minus one.

28. The method of claim 24, wherein said plurality of conditions comprises a speed access variable, said speed access variable allowing a high speed transceiver of said second layer transceiver device to write said availability multiple times during a synchronization period.

* * * * *

UNITED STATES PATENT AND TRADEMARK OFFICE
CERTIFICATE OF CORRECTION

PATENT NO. : 6,952,420 B1
DATED : October 4, 2005
INVENTOR(S) : Castellano

It is certified that error appears in the above-identified patent and that said Letters Patent is hereby corrected as shown below:

Drawings,
Sheet 5, Fig. 4B, replace reference numeral "430" with -- 460 --.

Column 1,
Line 38, delete "net work" and replace with -- network --.
Line 40, delete "die" and replace with -- the --.

Column 13,
Line 36, delete "2^6" and replace with -- 2^16 --.

Signed and Sealed this

Seventh Day of March, 2006

JON W. DUDAS
*Director of the United States Patent and Trademark Office*